3,560,111
METHOD OF AND APPARATUS FOR PUMPING LIQUIDS AT HIGH TEMPERATURE BY MAKING A GASEOUS EMULSION

Jacques Sterlini, Paris, France, assignor to Compagnie Electro Mecanique, Paris, France
Filed Nov. 22, 1968, Ser. No. 778,121
Claims priority, application France, Dec. 1, 1967, 130,635
Int. Cl. F04b 19/00, 19/24; F04f 1/00
U.S. Cl. 417—54     3 Claims

ABSTRACT OF THE DISCLOSURE

A method and apparatus for pumping hot liquids by making a gaseous emulsion in which a gas flowing in a closed cycle is injected in a compressed state in the form of fine bubbles into a hot liquid to be pumped to form an emulsion. The gas in the emulsion is allowed to heat up to the temperature of the liquid, the emulsion is then expanded accompanied by a transfer of heat from the liquid to the gas, the gas is then separated from the liquid and, after cooling, is passed to a low temperature compressor. The gas after being compressed is then reinjected into the liquid following a heat exchange with the hot gas after being separated from the liquid.

---

Figure 1:
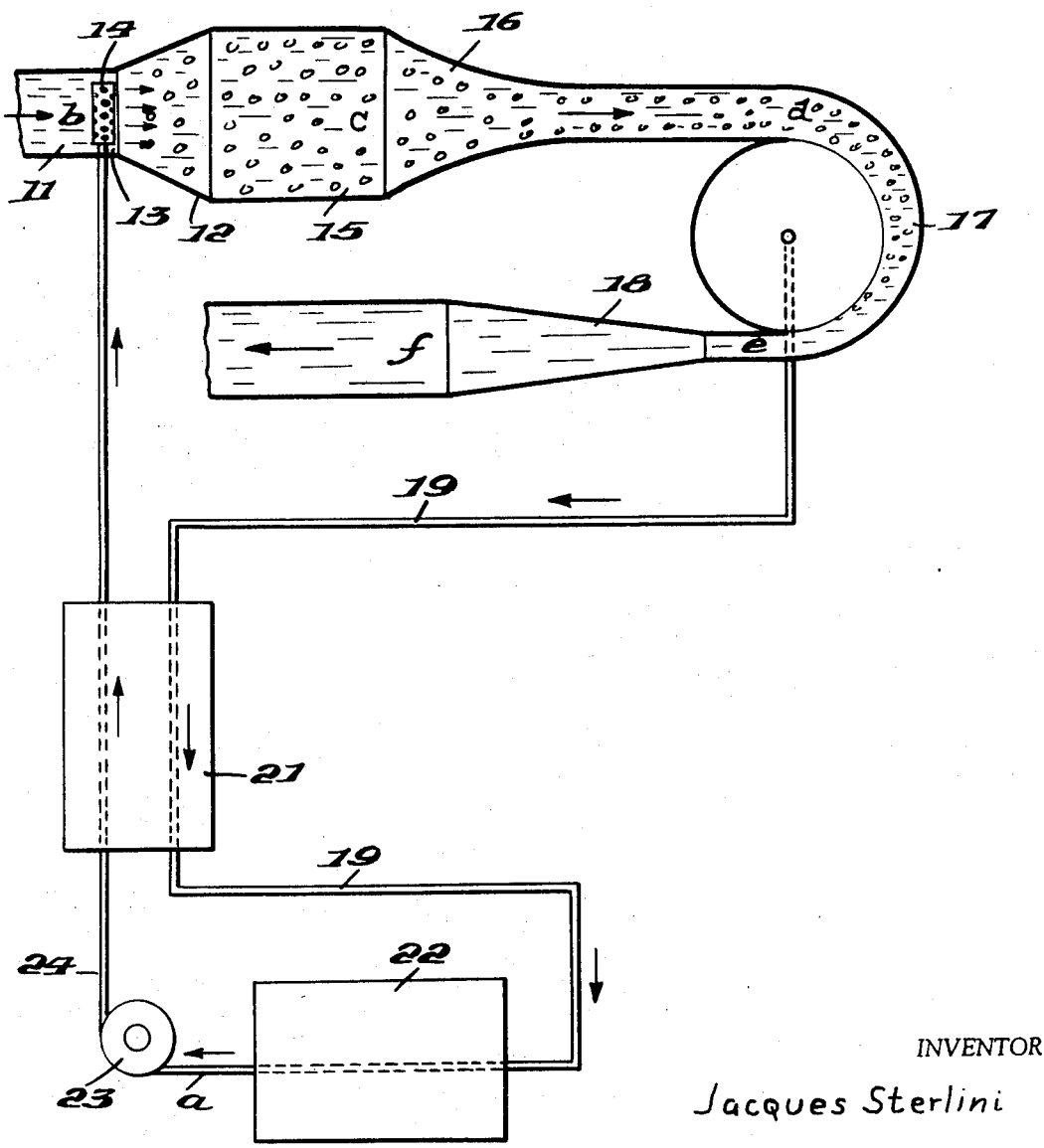

The present invention relates to an improved method of and apparatus for pumping liquids at high temperature by making a gaseous emulsion.

Pumps for the circulation of liquids brought to high temperature are very difficult to design, particularly if such liquids are corrosive. This is particularly true in the case of circuit of hot liquid metals. It is therefore advisable, in such cases, to use pumping means which have no moving part in direct contact with the liquid.

A method is already known for moving a hot liquid without intervention of moving parts, such method being more specially applicable to the propulsion of reaction engines in a liquid medium. Such a method is disclosed in French Pat. No. 1,044,115. The method envisages, in particular, the introduction into the hot liquid of a gas injected in the form of finely divided bubbles, and then the expansion of the composite fluid thus obtained in order to provoke an acceleration of the liquid.

The present invention envisages a special application of this principle of pumping liquids at high temperature.

With this in mind, the method of pumping a liquid at high temperature by formation of a gaseous emulsion, is characterized in that first a gas is compressed, the compressed gas is then injected into a hot liquid in such manner as to form an emulsion of fine bubbles of gas in the liquid to be pumped, the gas is then allowed to heat up to the temperature of the liquid, the gaseous emulsion is then permitted to expand, with transfer of heat from the liquid to the gas, the gas is then separated from the liquid and is then cooled to a temperature proper for introduction into a compressor in which it is then recompressed prior to reinjection into the liquid, so that the rise in generating pressure necessary to ensure movement of the liquid in its circuit, is obtained from the heat energy of the liquid by means of the gas emulsified in the latter.

Preferably, a heat exchange is operated between the hot expanded gas, obtained after its separation from the liquid, and the gas, compressed before reinjection of the latter into the liquid, in such a manner as to raise the thermodynamic efficiency while reducing the losses of heat to the cold source.

The invention has for another object to provide a novel apparatus for application of the improved process, this apparatus being comprised of a liquid circuit including an inlet duct for hot liquid, a divergence duct connected to this inlet duct, a device for injection of compressed gas into the liquid circuit in the vicinity of the junction between the inlet duct and the entrance to the divergence duct, a tranquilization duct or chamber of constant cross section connected to the outlet from the divergence duct, a convergence duct connected to the outlet from the tranquilization duct, a gas-liquid separator connected to the outlet from the convergence duct; and a closed gas circuit, this circuit comprising a first duct connected to the outlet from the separator where the gas appears, a heat-exchange device through which this gas duct passes, a cooler unit through which the gas passes after leaving the heat-exchange device, and a low temperature compressor into which the gas passes after leaving the cooler unit. A second gas duct extends from the outlet of the compressor through the heat-exchange device where an exchange of heat is made between the expanded hot gas passing through the fist duct and the compressed, cold gas passing through the second duct, and the gas after leaving the heat exchange device passes onward through the second duct to the gas injection device interposed in the liquid circuit for recycling.

The method and apparatus in accordance with the invention offers several advantages. In the first place, the apparatus has no other rotary member than a low-temperature gas compressor. Moreover, it operates better since the temperature of the liquid is higher. As a matter of fact, the useful work furnished by expansion of the hot gas (at the temperature of the liquid) is the greater, and more superior to the work consumed by the cold gas compressor, as the ratio of the absolute temperatures of the liquid and the cold gas is higher.

Finally, the apparatus according to the invention is capable of pumping liquids at the limit of temperature where the technology of static devices exists, hence at temperatures higher than those permitted by use of rotary machines.

Figure 2:
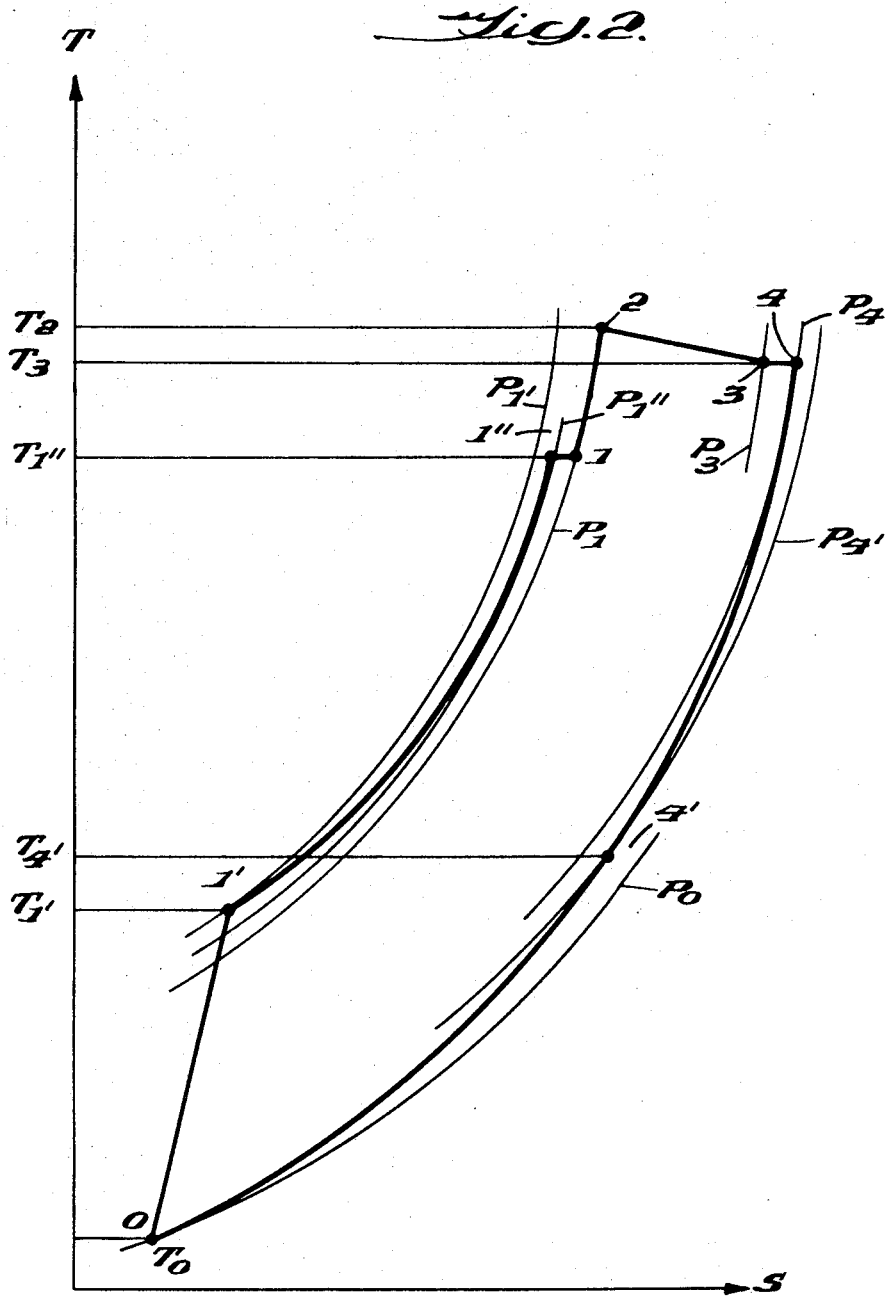

One suitable embodiment of the invention by way of a nonlimiting example, will now be described in detail with reference to the attached drawings in which it has been illustrated. In these drawings:

FIG. 1 is a somewhat schematic view of the improved apparatus for pumping liquid in which the structural details of the various operating components have been omitted in the interest of simplicity; and FIG. 2 is an entropic diagram of the closed gas cycle involved.

With reference now to the drawings, the hot liquid pumping apparatus comprises a liquid circuit traversed by the liquid and partially by the bubbles of the injected gas, and a closed gas circuit traversely exclusively by gas. The liquid circuit is seen to comprise a feed or inlet duct 11 of uniform cross-section such as cylindrical which is connected to the smaller, inlet end of a divergent duct 12, e.g., of frusto-conical configuration. Located in the zone 13 of the junction between the inlet and divergent ducts is a device 14 by means of which gas is injected into the hot liquid in the form of fine bubbles to form an emulsion, this gas being one which is chemically inert with respect to the hot liquid.

A tranquilization chamber 15 in the form of a cylindrical duct is connected to the larger, outlet end of the divergent duct 12 and the outlet end of the tranquilization chamber is connected to the inlet of a convergent duct 16 whose outlet is connected to the inlet of a separator 17 of any conventional type, e.g., one of the vortex type. At the liquid outlet of separator 17, the liquid is introduced into a diffusor duct section 18 through which it passes.

The closed circuit of the gas, which is injected into the liquid and then separated out, comprises a first duct 19 connected to the gas outlet from separator 17, this duct passing through a heat exchanger unit 21, thence into and through a cooler unit 22 after which the gas passes to the inlet of a low temperature compressor 23. A second duct 24, connected to the outlet of compressor 23, passes through the heat exchanger unit 21, in opposite direction to the direction of the gas flow through duct 19, and thence to the gas injection device 14 for recycling.

The operation of the apparatus will now be explained with reference to the entropic gas cycle shown in FIG. 2, in which the entropy S is plotted on the abscissa, and temperature T on the ordinate.

The injected gas follows a closed cycle. The starting point of the cycle will be considered as the point 0 on the diagram which corresponds to the state of the gas at the point $a$ at the entrance to compressor 23. The gas is then cold (at a temperature to close to ambient temperature) and at low pressure (pressure $P_0$). The gas is then compressed in compressor 23 (for example adiabatically as shown in FIG. 2) to state 1', (pressure $P_{1'}$, temperture $T_{1'}$). The adiabatic compression is chosen, preferably by reason of existing technology. However, an isothermic compression would be more favorable from a point of view of efficiency.

The gas after leaving compressor 23 is then heated in the heat-exchanger 21, by heat-exchange in counter-current with the expanded hot gas, and at the end of the cycle reaches duct 19. In the heat-exchanger 21, the gas passes from state 1' to state 1'' (pressure $P_{1''}$, temperature $T_{1''}$). The gas emerging from heat-exchanger 21 in state 1'' is injected in the form of fine bubbles uniformly distributed in the liquid, arriving at pressure $P_1$ in duct 11.

As soon as it is emulsified in the liquid, the gas is then in state 1 (pressure $P_1$ of the liquid, slightly below $P_{1''}$ because of losses of head, and temperature $T_{1''}$). The portion of the gas circuit between points $b$ (gas injection point) and $c$ (zone of connection between chamber 15 and convergent duct 16) is a zone of tranquilization where the gas gradually assumes the temperature $T_2$ of the liquid. It then gradually passes to state 2 (pressure $P_1$, temperature $T_2$).

Then the gas-liquid emulsion passes through the section of the circuit $c$–$d$ in the convergent duct 16 where the emulsified fluid expands to pressure $P_3$. This duct section is long enough for the time of contact between gas and liquid to ensure heat-exchange each with the other, allowing an expansion close to isothermic. The gas then passes to state 3 (pressure $P_3$, temperature $T_3$, slightly below $T_2$). At point $d$ the speed of the emulsion is raised, thanks to the preceding expansion.

The section $d$–$e$ of the gas circuit which follows forms part of separator 17 where the gas is separated from the liquid. The gas thus separated is in state 4: its temperature is $T_3$ and its pressure $P_4$, the pressure interval $P_3$–$P_4$ corresponding to the losses by separation.

The hot-expanded gas flows in duct 19 and passes into heat-exchanger 21 where it gives up part of its sensible heat to the compressed, cold gas flowing in counter current. At the outlet of heat exchanger 21, the gas is in state 4'; pressure $P_{4'}$ (the interval $P_4$–$P_{4'}$ is the loss of head in the exchanger) and temperature $T_{4'}$.

The temperature intervals necessary for the operation of heat-exchanger 21 are $T_3$–$T_{1''}$ at the entry, and $T_{4'}$–$T_{1'}$ at the outlet.

The gas then passes into the cooler unit 22 where it gives off its residual sensible heat into the atmosphere.

At the outlet from cooler unit 22, the gas is again in the initial state 0: the pressure interval $P_{4'}$–$P_0$ is obviously the loss of head in cooler unit 22.

Between points $c$ and $d$ in the circuit, the gas has exerted work on the liquid equal to the quantity of heat which it has taken from it if the expansion is isothermic, the kinetic energy of the gas being, of course, assumed negligible in comparison with that of the liquid. In sum, all of the above operation therefore result in the transformation of the thermic energy of the liquid into kinetic energy. The apparatus according to the invention therefore constitutes a heat machine in which the calorific capacity of the liquid plays the role of the hot source, and the cooler 22 that of the cold source.

From point $e$ of the liquid circuit, that is to say at the outlet from separator 17, the stopping pressure of the liquid is thus brought to a level above what it was at point $b$. The liquid can then be compressed in the section $e$–$f$ of the circuit corresponding to diffuser 18 by slowing it down to the desired speed.

In conclusion, it is to be understood that the embodiment of the invention which has been described and in reference to the attached drawing has been given purely by way of example and is in no way limiting, and that modifications may accordingly be established without departing from the spirit and scope of the invention.

As an example of an application of the invention, the fluid to be pumped may be liquid sodium which serves as the coolant for a nuclear reactor and the gas injected into the liquid may be helium or argon.

I claim:

1. The method of pumping a hot liquid along a duct system which comprises the step of compressing a gas, injecting the compressed gas in the form of fine bubbles into the hot liquid to form a gas-liquid emulsion, effecting a transfer of heat from the liquid to the gas so that the gas reaches essentially the same temperature as that of the liquid, expanding the gas-liquid emulsion thus formed to effect a transfer of heat from the liquid to the gas, while the expansion work of the gas is transferred to the liquid, thus raising its head-pressure, separating the gas from the liquid, cooling the separated out gas, and re-compressing the cooled gas to the pressure of the liquid and re-injecting the compressed gas into the liquid, both at the same pressure, to initiate a new cycle.

2. The method of pumping a hot liquid as defined in claim 1 and which includes the further step of effecting a transfer of heat from the hot gas following its separation from the liquid to the relatively cold compressed gas prior to reinjection thereof into the liquid.

3. Apparatus for pumping a liquid at high temperature comprising a gas circuit, a liquid circuit including an inlet duct for the hot liquid, a divergent duct connected to said inlet duct, a tranquilizing chamber connected to the outlet from said divergent duct wherein gas is brought up to the temperature of the liquid, a convergent duct connected to the outlet from said tranquilizing chamber, a separator connected to the outlet from said convergent duct for separating gas from liquid; said gas circuit operating on a closed cycle, said gas circuit including a first duct connected to the gas outlet from said separator, a heat exchanger through which said first gas duct passes to give up its heat, a cooler unit through which said first duct then passes, a low temperature compressor having its inlet connected to said first gas duct following its passage through said cooler unit, a second gas duct connected to the outlet from said compressor, said second gas duct passing through said heat exchanger to pick up heat transferred from the hot gas in said first gas duct, and an emulsifier unit in said liquid circuit located in the vicinity of the junction between said inlet duct and divergent duct and connected to said second gas duct for injecting the gas in the form of fine bubbles into the hot liquid.

(References on following page)

References Cited

UNITED STATES PATENTS

| | | | |
|---|---|---|---|
| 1,309,721 | 7/1919 | Drinkern | 103—1 (heat pumps)UX |
| 2,275,947 | 3/1942 | Courtney | 103—232 |
| 2,399,634 | 5/1946 | Holland et al. | 103—232X |
| 2,675,081 | 4/1954 | Nowak | 103—260X |
| 2,975,723 | 3/1961 | Andrews | 103—231.5 |
| 3,133,507 | 5/1964 | Van Der Ster | 103—231.5 |
| 3,302,586 | 2/1967 | Brugnoli | 103—232 |
| 3,374,743 | 3/1968 | Stutely et al. | 103—1 |

FOREIGN PATENTS

| | | | |
|---|---|---|---|
| 1,044,115 | 6/1953 | France | 103—1 |
| 142,110 | 4/1920 | Great Britain | 103—232 |

DONLEY J. STOCKING, Primary Examiner

W. J. KRAUSS, Assistant Examiner

U.S. Cl. X.R.

417—65